(12) United States Patent
Sakamoto et al.

(10) Patent No.: US 10,082,603 B2
(45) Date of Patent: Sep. 25, 2018

(54) OPTICAL COMPONENT PRODUCTION METHOD, OPTICAL COMPONENT, AND OPTICAL PANEL PRODUCTION METHOD

(71) Applicant: ASAHI GLASS COMPANY, LIMITED, Chiyoda-ku (JP)

(72) Inventors: Hiroshi Sakamoto, Chiyoda-ku (JP); Kosuke Takayama, Chiyoda-ku (JP); Junichi Kakuta, Chiyoda-ku (JP); Yuriko Kaida, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 747 days.

(21) Appl. No.: 14/551,679

(22) Filed: Nov. 24, 2014

(65) Prior Publication Data
US 2015/0079354 A1    Mar. 19, 2015

Related U.S. Application Data

(63) Continuation of application No. PCT/JP2013/064118, filed on May 21, 2013.

(30) Foreign Application Priority Data

May 24, 2012 (JP) .................................. 2012-118514

(51) Int. Cl.
*B05D 5/06* (2006.01)
*G02B 1/04* (2006.01)
(Continued)

(52) U.S. Cl.
CPC ............... *G02B 1/04* (2013.01); *B05D 3/12* (2013.01); *B05D 5/06* (2013.01); *B29C 59/026* (2013.01);
(Continued)

(58) Field of Classification Search
CPC ...... G02B 1/04; G02B 5/3058; G02B 3/0031; G02B 1/118; B05D 5/06; B05D 3/12; B29C 59/026; B29C 59/046; Y10T 428/24612
(Continued)

(56) References Cited

U.S. PATENT DOCUMENTS 6,110,401 A   8/2000 Lee et al.
8,027,086 B2 * 9/2011 Guo ...................... B82Y 40/00
                                                        264/1.31
(Continued)

FOREIGN PATENT DOCUMENTS

CN      101437772 A    5/2009
CN      101466749 A    6/2009
(Continued)

OTHER PUBLICATIONS

Kooy et al, "A review of roll-to-roll nanoimprint lithography", Nanoscale Research Letters 2014, 9:320, published Jun. 2014.*
(Continued)

*Primary Examiner* — Michael P Wieczorek
*Assistant Examiner* — Michael G Miller
(74) *Attorney, Agent, or Firm* — Oblon, McClelland, Maier & Neustadt, L.L.P.

(57) ABSTRACT

A method of producing an optical component includes a transfer step of sandwiching a molding material layer of a molding material between a thin glass plate and a mold and transferring an indented pattern on the mold to the molding material layer to form a patterned indented layer on the thin glass plate, and a separation step of separating the mold from the patterned indented layer. During the transfer step, a reinforcing plate is removably attached to the thin glass plate.

18 Claims, 12 Drawing Sheets

(51) Int. Cl.
*G02B 1/118* (2015.01)
*G02B 3/00* (2006.01)
*G02B 5/30* (2006.01)
*B29C 59/04* (2006.01)
*B29C 59/02* (2006.01)
*B05D 3/12* (2006.01)

(52) U.S. Cl.
CPC ............ *B29C 59/046* (2013.01); *G02B 1/118* (2013.01); *G02B 3/0031* (2013.01); *G02B 5/3058* (2013.01); *Y10T 428/24612* (2015.01)

(58) Field of Classification Search
USPC .................................................. 427/160–169
See application file for complete search history.

(56) References Cited

U.S. PATENT DOCUMENTS

| 2007/0071948 A1* | 3/2007 | Yokoyama | B29C 33/3857 |
| | | | 428/172 |
| 2009/0110882 A1* | 4/2009 | Higuchi | B32B 7/06 |
| | | | 428/138 |
| 2009/0148682 A1 | 6/2009 | Higuchi | |
| 2010/0240840 A1 | 9/2010 | Toyama et al. | |
| 2012/0202010 A1 | 8/2012 | Uchida | |

FOREIGN PATENT DOCUMENTS

| JP | 2001-058352 | 3/2001 |
| JP | 2002-523259 | 7/2002 |
| JP | 2008-110590 | 5/2008 |
| JP | 2008-137282 | 6/2008 |
| JP | 2008-296390 | 11/2008 |
| JP | 2009-042319 | 2/2009 |
| WO | WO 2007/129554 A1 | 11/2007 |
| WO | WO 2007/145246 A1 | 12/2007 |
| WO | WO 2008/007622 A1 | 1/2008 |
| WO | WO 2011/048979 A1 | 4/2011 |

OTHER PUBLICATIONS

International Search Report received in PCT/JP2013/064118, dated Sep. 3, 2013.

* cited by examiner

OPTICAL COMPONENT PRODUCTION METHOD, OPTICAL COMPONENT, AND OPTICAL PANEL PRODUCTION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2013/064118, filed on May 21, 2013, which is based on and claims the benefit of priority of Japanese Patent Application No. 2012-118514 filed on May 24, 2012, the entire contents of which are incorporated herein by reference.

BACKGROUND OF THE INVENTION

1. Field of the Invention

An aspect of this disclosure relates to an optical component production method, an optical component, and an optical panel production method.

2. Description of the Related Art

Japanese Laid-Open Patent Publication No. 2009-42319, for example, discloses an optical component produced by imprinting and used for optical panels such as a liquid crystal panel and an organic EL panel. In the imprinting, a molding material is sandwiched between a substrate and a mold and is cured (hardened) to transfer an indented pattern on the mold to the molding material and thereby form a patterned indented layer on the substrate. Examples of optical components include a moth-eye antireflection component, a wire-grid polarization component, and a lenticular lens.

As the substrate of an optical component, a glass plate is preferably used because of its flatness, smoothness, and low thermal expansivity.

Here, because of a demand for a thinner optical panel, there is also a demand for a thinner optical component. However, as a glass plate used as a substrate of an optical component becomes thinner, the glass plate becomes more fragile and it becomes more difficult to form a patterned indented layer on the glass plate.

SUMMARY OF THE INVENTION

In an aspect of this disclosure, there is provided a method of producing an optical component that includes a transfer step of sandwiching a molding material layer of a molding material between a thin glass plate and a mold and transferring an indented pattern on the mold to the molding material layer to form a patterned indented layer on the thin glass plate, and a separation step of separating the mold from the patterned indented layer. During the transfer step, a reinforcing plate is removably attached to the thin glass plate.

DESCRIPTION OF THE PREFERRED EMBODIMENTS

Figure 1A:
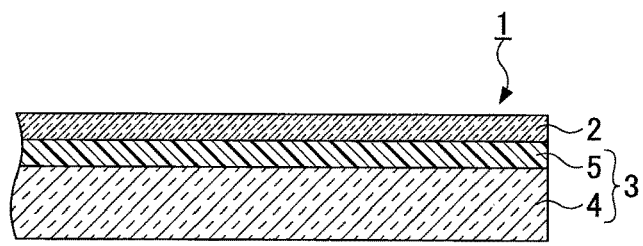
FIGS. 1A through 1E are drawings illustrating a method of producing an optical component according to a first embodiment.

Embodiments of the present invention are described below with reference to the accompanying drawings. The same reference numbers are assigned to the same or corresponding components in the drawings, and repeated descriptions of those components are omitted.

<<First Embodiment>>

FIGS. 1A through 1E are drawings illustrating a method of producing an optical component 10 according to a first embodiment. The optical component 10 of the first embodiment is a moth-eye antireflection component used to produce a liquid-crystal panel that is an example of an optical panel.

Figure 1B:
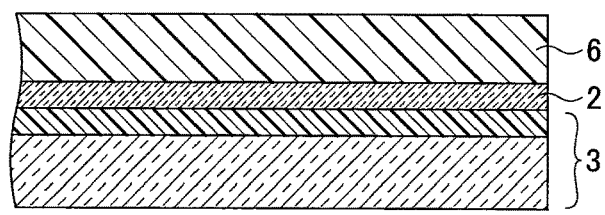
Figure 1C:
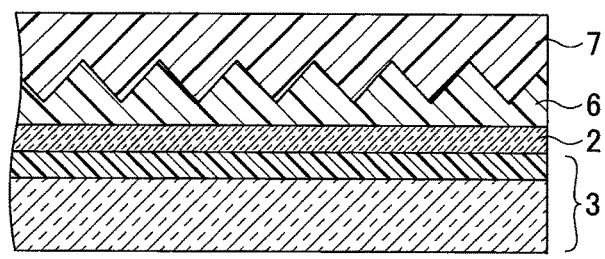
Figure 1D:
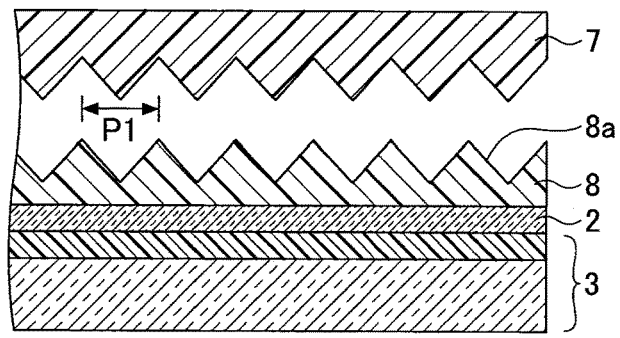
Figure 1E:
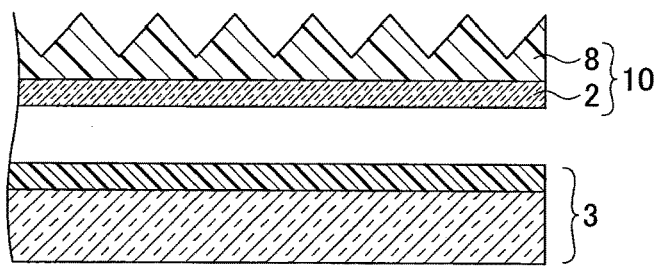

The method of producing the optical component 10 includes a step of preparing a laminated plate 1 (FIG. 1A), a step of forming a molding material layer 6 on a thin glass plate 2 of the laminated plate 1 (FIG. 1B), a transfer step of pressing a mold 7 against a surface of the molding material layer 6 to form a patterned indented layer 8 (FIG. 1C), and a separation step of separating the mold 7 from the patterned indented layer 8 (FIG. 1D). The method of producing the optical component 10 may also include a removal step of removing a reinforcing plate 3 from the thin glass plate 2 (FIG. 1E). As a result of the removal step, the optical component 10 including the thin glass plate 2 is obtained. The optical component 10 is translucent.

The removal step may be performed at any timing after the transfer step. For example, the removal step may be performed during a process of producing an optical panel. In this case, the optical component 10 is shipped with the reinforcing plate 3 attached.

<Step of Preparing Laminated Plate>

As illustrated by FIG. 1A, the laminated plate 1 may include the thin glass plate 2 and the reinforcing plate 3 for reinforcing the thin glass plate 2.

The thin glass plate 2 is translucent. The thin glass plate 2 may be made of, for example, oxide glass including silicon oxide as a major component. Examples of such oxide glass include non-alkali glass, borosilicate glass, soda lime glass, and high-silica glass. Glass including 40 mass % to 90 mass % of silicon oxide in terms of oxide is preferably used as oxide glass. Glass used for the thin glass plate 2 may be selected depending on the purpose of an optical component and/or a type of an optical panel. For example, non-alkali glass that includes substantially no alkali metal component may be used for a liquid-crystal panel.

The thickness of the thin glass plate 2 is preferably less than or equal to 0.3 mm, more preferably less than or equal to 0.2 mm, further preferably less than or equal to 0.1 mm, and particularly preferably less than or equal to 0.05 mm. Also, in terms of formability of the thin glass plate 2, the thickness of the thin glass plate 2 is preferably greater than or equal to 0.0001 mm, more preferably greater than or equal to 0.001 mm, and further preferably greater than or equal to 0.005 mm.

The reinforcing plate 3 is used to reinforce the thin glass plate 2 until the reinforcing plate 3 is removed from the thin glass plate 2. The reinforcing plate 3 is removed from the thin glass plate 2 after the transfer step, and does not constitute a part of an optical panel.

The difference in thermal expansivity between the thin glass plate 2 and the reinforcing plate 3 is preferably small to prevent the laminated plate 1 from being warped due to a temperature change and prevent the reinforcing plate 3 from being unintentionally removed from the thin glass plate 2 due to a temperature change. The reinforcing plate 3 preferably includes a glass plate made of the same glass as the thin glass plate 2. The temperature of the laminated plate 1 changes, for example, when the patterned indented layer 8 is formed by thermal imprinting. In thermal imprinting, the laminated plate 1 is heated and cooled when a molding material is heated and cooled.

The reinforcing plate 3 may include a support plate 4 and a removable layer 5 formed on the support plate 4. The removable layer 5 and the thin glass plate 2 are removably joined together by, for example, Van der Waals force that acts between the removable layer 5 and the thin glass plate 2. The removable layer 5 may be either a resin layer or an inorganic oxide layer.

Although the reinforcing plate 3 of the present embodiment includes the support plate 4 and the removable layer 5, the reinforcing plate 3 may be constituted only by the support layer 4. In this case, the support plate 4 and the thin glass plate 2 are removably joined together by, for example, van der Waals force that acts between the support plate 4 and the thin glass plate 2. Areas with different degrees of surface roughness may be formed on a surface of the support plate 4 so that areas with different bonding strengths are formed at the interface between the support plate 4 and the thin glass plate 2. This makes it easier to remove the support plate 4 from the thin glass plate 2.

The reinforcing plate 3 may also be formed by alternately stacking glass plates and resin layers. In this case, the outermost resin layer functions as a removable layer. Also in this case, the reinforcing plate 3 may include multiple support plates 4 and multiple resin layers.

The support plate 4 supports the thin glass plate 2 via the removable layer 5. The support plate 4 prevents the thin glass plate 2 from being broken by a force applied to press the mold 7 against the surface of the molding material layer 6.

The support plate 4 may be implemented by, for example, a glass plate, a ceramics plate, a resin plate, a semiconductor plate, or a metal plate. Using a glass plate for the support plate 4 makes it possible to minimize the difference in thermal expansivity between the thin glass plate 2 and the reinforcing plate 3, and thereby makes it possible to prevent the laminated plate 1 from being warped due to a temperature change and prevent the reinforcing plate 3 from being unintentionally removed from the thin glass plate 2 due to a temperature change. Using a resin plate or a metal plate for the support plate 4 makes it possible to improve the flexibility of the reinforcing plate 3, and thereby makes it easier to remove the reinforcing plate 3 from the thin glass plate 2.

The difference (absolute value) between average linear expansion coefficients of the support plate 4 and the thin glass plate 2 may be set at any appropriate value depending on the size and shape of the thin glass plate 2, and is preferably less than or equal to $35 \times 10^{-7}/°$ C. In the present embodiment, "average linear expansion coefficient" indicates an average linear expansion coefficient in a temperature range between 50° C. and 300° C. (JIS R 3102).

The thickness of the support plate 4 is preferably less than or equal to 2.0 mm, and more preferably less than or equal to 0.7 mm. Also, to reinforce the thin glass plate 2, the thickness of the support plate 4 is preferably greater than or equal to 0.4 mm. The thickness of the support plate 4 may be greater or less than the thickness of the thin glass plate 2.

The dimensions (width and length) of the support plate 4 are preferably the same as the dimensions of the removable layer 5 as illustrated in FIGS. 1A through 1E or greater than the dimensions of the removable layer 5 so that the entire removable layer 5 can be supported by the support plate 4.

The removable layer 5 prevents displacement of the thin glass plate 2 until it is removed from the thin glass plate 2. The removable layer 5 can be easily removed from the thin glass plate 2 by a removal operation (or removal step). This property of the removable layer 5 makes it possible to prevent the thin glass plate 2 from being damaged, and makes it possible to prevent the laminated plate 1 from being separated into layers at an unintended position (e.g., at a position between the removable layer 5 and the support plate 4).

The removable layer 5 is configured such that the bonding strength between the removable layer 5 and the support plate 4 becomes greater than the bonding strength between the removable layer 5 and the thin glass plate 2. This configuration makes it possible to prevent the laminated plate 1 from being separated into layers at an unintended position (e.g., at a position between the removable layer 5 and the support plate 4) when a removal operation is performed.

The removable layer 5 may include any type of resin. Examples of resin used for the removable layer 5 include acrylic resin, polyolefin resin, polyurethane resin, polyimide resin, silicone resin, and polyimide silicone resin. A mixture of two or more types of resin may also be used. In terms of heat resistance and removability, silicone resin and polyimide silicone resin are particularly preferable.

The thickness of the removable layer 5 is not limited to any specific value. When the removable layer 5 is made of a resin layer, the thickness of the removable layer 5 is preferably between 1 μm and 50 μm, and more preferably between 4 μm and 20 μm. When the thickness of the removable layer 5 is greater than or equal to 1 μm, the removable layer 5 can deform and absorb the thickness of air bubbles or foreign matter having entered between the removable layer 5 and the thin glass plate 2. On the other hand, when the thickness of the removable layer 5 is less than or equal to 50 μm, the amount of time and the amount of resin necessary to form the removable layer 5 can be reduced.

The dimensions (width and length) of the removable layer 5 are preferably the same as the dimensions of the thin glass plate 2 as illustrated in FIGS. 1A through 1E or greater than the dimensions of the thin glass plate 2 so that the entire thin glass plate 2 can be supported by the removable layer 5. When the dimensions of the removable layer 5 are greater than the dimensions of the thin glass plate 2, the reinforcing plate 3 can be gradually and smoothly removed from the thin glass plate 2 by bending a part of the removable layer 5 that extends across an edge of the thin glass plate 2.

The removable layer 5 may include multiple types of resin layers. In this case, the thickness of the removable layer 5 represents the total thickness of all of the resin layers.

The laminated plate 1 may be produced, for example, by one of methods (1) through (3) described below. In method (1), a fluid resin composition is applied to the support plate 4 and cured to form the removable layer 5, and then the thin glass plate 2 is pressure-bonded onto the removable layer 5. In method (2), a fluid resin composition is applied to a substrate and cured to form the removable layer 5, the removable layer 5 is peeled off from the substrate to obtain a film of the removable layer 5, the film is placed between the thin glass plate 2 and the support plate 4, and they are pressure-bonded together. In method (3), a resin composition is placed between the thin glass plate 2 and the support plate 4 and cured to form the removable layer 5.

With method (1), the resin composition interacts with the support plate 4 when the resin composition cures, and therefore the bonding strength between the support plate 4 and the removable layer 5 tends to become greater than the bonding strength between the removable layer 5 and the thin glass plate 2.

Method (2) is effective when the removable layer 5 exhibits a low bonding strength to the thin glass plate 2 and a high bonding strength to the support plate 4 after the pressure bonding. Surface treatment may be performed on the surface of one of the thin glass plate 2 and the support plate 4 before they are brought into contact with the removable layer 5 so that the bonding strengths after the pressure bonding between the removable layer 5 and the thin glass plate 2 and between the removable layer 5 and the support plate 4 become different from each other.

Method (3) is effective when the resin composition exhibits a low bonding strength to the thin glass plate 2 and a high bonding strength to the support plate 4 after curing. Surface treatment may be performed on the surface of one of the thin glass plate 2 and the support plate 4 before they are brought into contact with the resin composition so that the bonding strengths between the cured resin composition and the thin glass plate 2 and between the cured resin composition and the support plate 4 become different from each other.

In methods (1) through (3) described above, any type of resin composition may be used. For example, resin compositions may be classified based on their curing mechanisms into a condensation reaction type, an addition reaction type, an ultraviolet curing type, and an electron radiation curing type. A resin composition of any one of these types may be used in methods (1) through (3). Among these types, a resin composition of the addition reaction type is particularly preferable because of its quick curing reaction, excellent removability when used to form the removable layer 5, and high heat resistance.

Also, resin compositions may be classified based on their forms into a solvent type, an emulsion type, and a solventless type. A resin composition of any one of these types may be used in methods (1) through (3). Among these types, a resin composition of the solventless type is particularly preferable because of its excellent productivity and environmental characteristics. Another reason is that a resin composition of the solventless type does not include a solvent that causes formation of air bubbles when the resin composition is cured by heat, ultraviolet light, or electron radiation to form the removable layer 5. Accordingly, using a resin composition of the solventless type makes it possible to prevent air bubbles from remaining in the removable layer 5.

There is a silicone resin composition that is the addition reaction type and the solventless type, and includes straight-chain polyorganosiloxane having a vinyl group and methylhydrogen polysiloxane having a hydrosilyl group. This silicone resin composition is heat-cured under the presence of a platinum catalyst to form a silicone resin layer.

Coating methods for applying a resin composition include, for example, spray coating, die coating, spin coating, dip coating, roll coating, bar coating, screen printing, and gravure coating. Any one of these coating methods may be selected depending on the type of resin composition.

The amount of application of a resin composition may be determined depending on the type of the resin composition. For example, in the case of the silicone resin composition described above, the amount of application is preferably between 1 $g/m^2$ and 100 $g/m^2$, and more preferably between 5 $g/m^2$ and 20 $g/m^2$.

Curing conditions for a resin composition may be determined depending on the type of the resin composition. For example, in the case of a silicone resin composition that is prepared by adding 2 mass units of platinum catalyst to 100 mass units of straight-chain polyorganosiloxane and methylhydrogen polysiloxane, the heating temperature in the atmosphere is preferably between 50° C. and 250° C., and more preferably between 100° C. and 200° C. Also in this case, the reaction time is preferably between 5 minutes and 60 minutes, and more preferably between 10 minutes and 30 minutes. When a heating temperature and a reaction time within the above ranges are used as curing conditions, oxidative decomposition of silicone resin does not occur at the same time, low-molecular-weight silicone components are not generated, and the silicone migration property does not become high.

In methods (1) and (2) described above, pressure bonding is preferably performed in a highly-clean environment. Methods of pressure bonding include roll pressure bonding and press pressure bonding. Pressure bonding may be performed in an atmospheric-pressure atmosphere, but is preferably performed in a reduced-pressure atmosphere to prevent air bubbles from entering. Pressure bonding may be performed at a temperature higher than the ambient temperature, but is preferably performed at the ambient temperature to prevent degradation of the removable layer 5.

In the present embodiment, the molding material layer 6 is formed on the thin glass plate 2 after the laminated plate 1 is formed. However, the reinforcing plate 3 may be attached to the thin plate glass 2 after the molding material layer 6 is formed on the thin plate glass 2 as long as the thin glass plate 2 is reinforced by the reinforcing plate 3 while the transfer step is performed.

<Step of Forming Molding Material Layer>

Although the molding material layer 6 is formed on the thin glass plate 2 in the present embodiment, the molding material layer 6 may instead be formed on the mold 7. In either case, the molding material layer 6 is sandwiched between the thin glass plate 2 and the mold 7 in the transfer step.

To improve the contact between the thin glass plate 2 and a molding material forming the molding material layer 6, surface treatment may be performed beforehand on the thin glass plate 2. Examples of surface treatment include primer treatment, ozone treatment, and plasma etching. As a primer, a silane coupling agent or silazane may be used.

The molding material includes, for example, a photo-setting resin. Photo-setting resins generally used in photo imprinting may be used for the molding material. A photo-setting resin includes a prepolymer and a photopolymerization initiator. Examples of radical polymerization prepolymers include acrylic monomer and vinyl monomer. Examples of ionic polymerization prepolymers include epoxy monomer and vinyl ether monomer. A photo-setting resin is prepared in the form of liquid, and applied to the thin glass plate 2 as illustrated by FIG. 1B.

Methods for applying a resin include, for example, die coating, roll coating, gravure coating, inkjet printing, spray coating, spin coating, flow coating, blade coating, and dip coating.

In the present embodiment, the molding material includes a photo-setting resin. Alternatively, the molding material may include a thermoplastic resin. Thermoplastic resins generally used in thermal imprinting may be used for the molding material. Examples of thermoplastic resins include acrylic resin, polycarbonate resin, and olefin resin. A thermoplastic resin may be prepared in the form of a sheet, and attached to the thin glass plate 2. Alternatively, a thermoplastic resin may be prepared in the form of a solution, and applied to the thin glass plate 2 and dried. Also, a thermoplastic resin may be softened by heating, applied to the thin glass plate 2, and cooled.

The molding material may also include particles of a metal oxide.

<Transfer Step and Separation Step>

At the transfer step, the patterned indented layer 8 is formed by imprinting. More specifically, at the transfer step, the molding material layer 6 is sandwiched between the thin glass plate 2 and the mold 7 to transfer an indented pattern on the mold 7 to the molding material layer 6 and thereby form the patterned indented layer 8. The indented pattern on the patterned indented layer 8 is an inverted pattern of the indented pattern on the mold 7.

In photo imprinting, the indented pattern on the mold 7 is pressed against a surface of the molding material layer 6 including a photo-setting resin, and the molding material layer 6 is illuminated by light to cure (or harden) the molding material layer 6 and thereby form the patterned indented layer 8.

Examples of light for curing the photo-setting resin include ultraviolet light, visible light, and infrared light. Examples of ultraviolet light sources include an ultraviolet fluorescent lamp, an ultraviolet light emitting diode (LED), a low-pressure mercury lamp, a high-pressure mercury lamp, an ultrahigh pressure mercury lamp, a xenon lamp, and a carbon-arc lamp. Examples of visible light sources include a visible light fluorescent lamp, visible light incandescent lamp, and a visible LED.

In photo imprinting, at least one of the mold 7 and the thin glass plate 2 is composed of an optically transparent material. Light emitted from a light source may enter the molding material layer 6 via the mold 7 that is transparent, or enter the molding material layer 6 via the reinforcing plate 3 and the thin glass plate 2 that are transparent.

Photo imprinting makes it possible to perform molding at the ambient temperature, reduce the chance that distortion occurs due to a difference between linear expansion coefficients of the mold 7 and the thin glass plate 2, and improve the transfer accuracy. To accelerate the curing reaction, the molding material layer 6 may be heated.

On the other hand, in thermal imprinting, the molding material layer 6 including a thermoplastic resin is softened by heating, the mold 7 is pressed against a surface of the softened molding material layer 6, and the molding material layer 6 is cooled and cured to form the patterned indented layer 8.

Examples of heat sources include a light source (e.g., a halogen lamp or a laser) that emits heating light and a heater. The heating temperature is greater than the glass transition temperature of the thermoplastic resin.

The order of the steps of heating the molding material layer 6 and pressing the mold 7 may be changed. Also, these steps may be performed at the same time. Further, the molding material layer 6 may be heated by heating the mold 7.

The mold 7 may be composed of a material including, for example, silicon, silicon oxide, silica glass, a metal (e.g., nickel or chrome), or a resin (e.g., polycarbonate or a cyclic olefin resin). Using a metal or a resin gives flexibility to the mold 7.

To reduce the costs for producing the mold 7, the mold 7 is formed by using a master mold and can be duplicated many times. Methods for duplicating the mold 7 include, for example, imprinting and electroforming. The master mold is produced by processing a base material by, for example, photolithography or electron-beam lithography.

The mold 7 may be shaped like a plate as illustrated in FIGS. 1C and 1D, or shaped like an endless belt. An endless-belt-shaped mold is formed by fusing ends of a plate-shaped mold to each other. An endless-belt-shaped mold is suitable for continuous production.

To improve the releasability of a resin from the surface of the mold 7, a mold release treatment may be performed on the mold 7. Examples of mold release treatments include fluorine coating and silicone coating.

In the present embodiment, as illustrated by FIG. 1C, the thin glass plate 2 is removably joined to the reinforcing plate 3 during the transfer step. Reinforcing the thin glass plate 2 with the reinforcing plate 3 makes it possible to prevent the thin glass plate 2 from being broken by a force applied to press the mold 7 against the surface of the molding material layer 6.

At the separation step, the mold 7 is separated from the patterned indented layer 8. The separation of the mold 7 from the patterned indented layer 8 is performed after the molding material layer 6 is cured.

In the present embodiment, as illustrated by FIG. 1D, the thin glass plate 2 is removably joined to the reinforcing plate 3 during the separation step. Reinforcing the thin glass plate 2 with the reinforcing plate 3 makes it possible to prevent the thin glass plate 2 from being broken by a force applied to separate the mold 7 from the patterned indented layer 8.

Figure 2A:
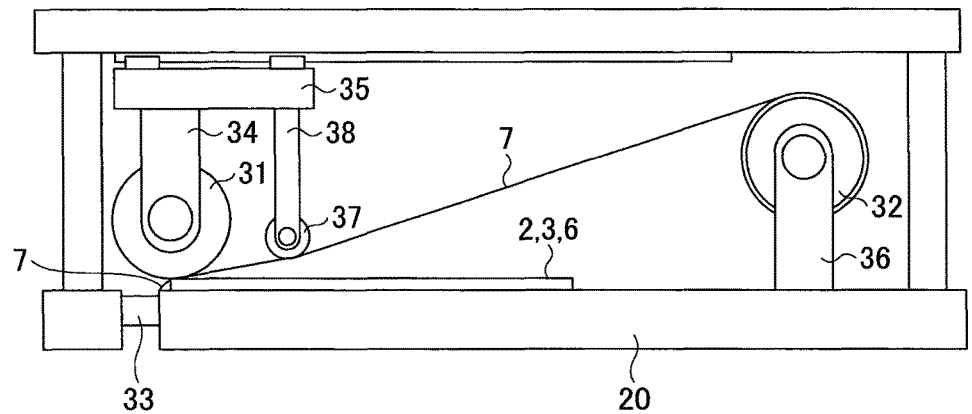
FIGS. 2A through 2C are drawings illustrating a transfer step and a separation step according to the first embodiment.
Figure 2B:
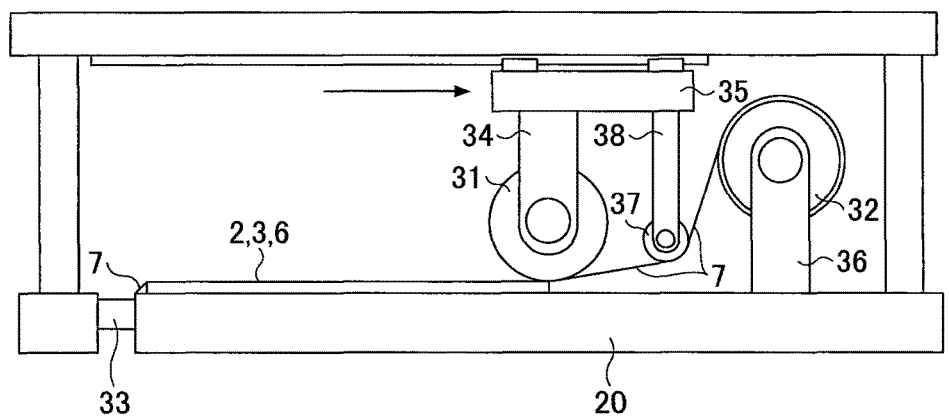
Figure 2C:
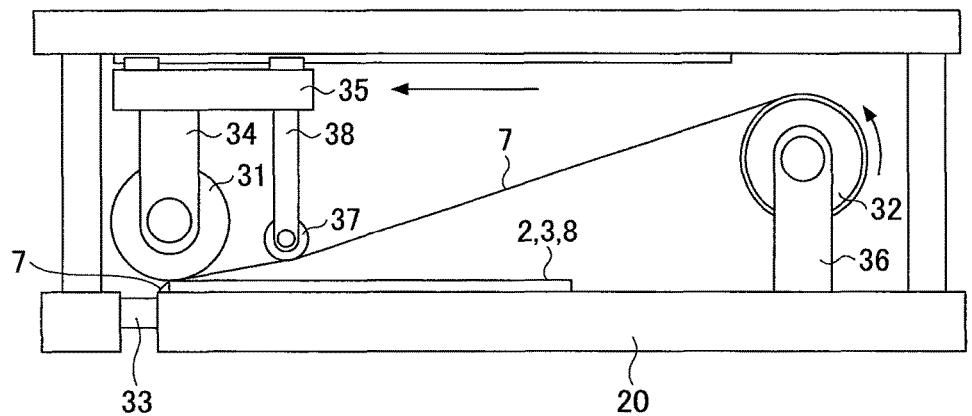
Figure 3:
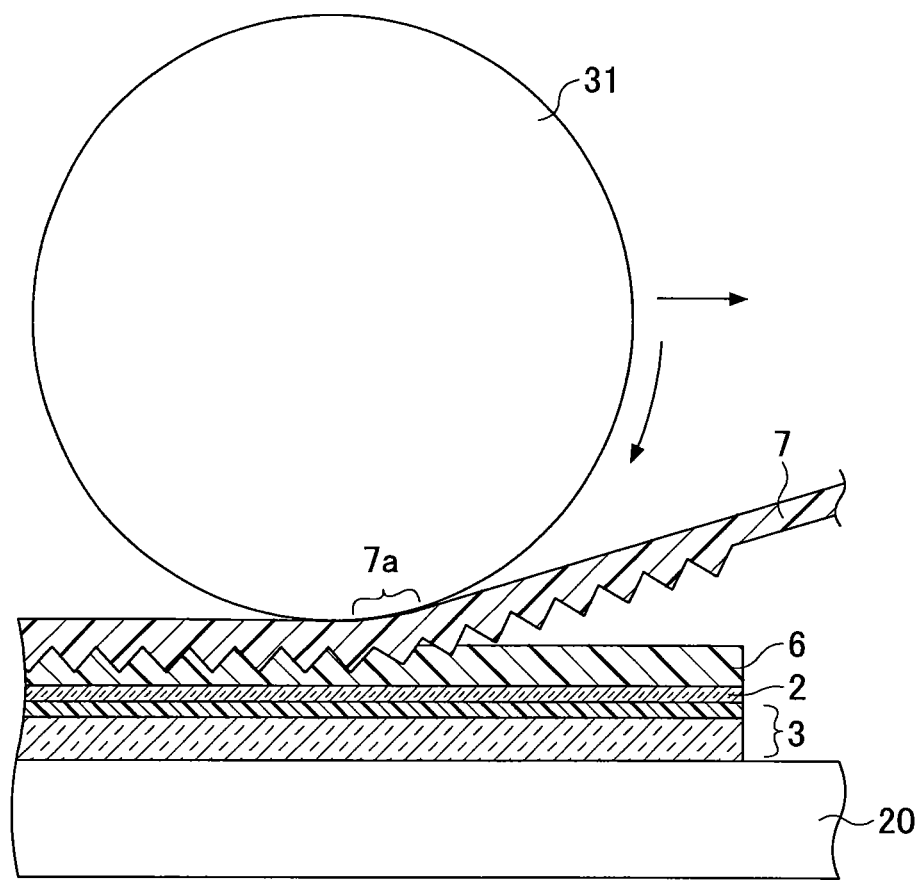
FIG. 3 is a drawing illustrating a mold and a molding material layer during a transfer step.

FIGS. 2A through 2C are drawings illustrating the transfer step and the separation step according to the first embodiment. FIG. 3 is a drawing illustrating the mold 7 and the molding material layer 6 during the transfer step.

The transfer step includes a step of pressing the mold 7 against the molding material layer 6 while curving (or bending) a part of the mold 7 and supporting the thin glass plate 2 in a level position (i.e., flat). Similarly, the separation step includes a step of separating the mold 7 from the patterned indented layer 8 while curving (or bending) a part of the mold 7 and supporting the thin glass plate 2 in a level position.

Thus, during the transfer step and the separation step, the thin glass plate 2 is supported in a level position via the reinforcing plate 3 by a stage 20. Because the thin glass plate 2 is supported in a level position, bending stress is not applied to the thin glass plate 2, and the quality of the optical component 10 is improved.

The transfer step and the separation step are performed, for example, using a pressure roller 31 for pressing the mold 7 against the molding material layer 6, a tension roller 32 for applying tension to the mold 7, and a jig 33 for fixing an end of the mold 7.

The pressure roller 31 is rotatably supported by a pressure roller support 34, and the pressure roller support 34 is fixed to a slider 35. The slider 35 can slide parallel to a support surface of the stage 20 for supporting the reinforcing plate 3. When the slider 35 moves, the pressure roller 31 moves relative to the stage 20. While the slider 35 moves, the distance between the pressure roller 31 and the stage 20 is kept constant. This makes it possible to align the upper ends of protrusions of the patterned indented layer 8 on the same plane.

The tension roller 32 is rotatably supported by a tension roller support 36, and the tension roller support 36 is fixed to the stage 20. An end of the mold 7 is fixed to the tension roller 32. When a driving source such as a rotary motor causes the tension roller 32 to rotate in a direction to wind the mold 7, tension is applied to the mold 7, and a part 7a (see FIG. 3) of the mold 7 wraps around the pressure roller 31 and curves along the circumference of the pressure roller 31. The axial direction of the tension roller 32 is parallel to the axial direction of the pressure roller 31. This configuration makes it possible to apply uniform tension to the mold 7.

The jig 33 fixes another end of the mold 7 to the stage 20. Instead of the jig 33, a fixed roller may be used. The fixed roller is rotatably supported by a fixed roller support, and the fixed roller support is fixed to the stage 20. When the tension roller 32 applies tension to the mold 7, rotation of the fixed roller is prevented by, for example, a braking device.

A middle roller 37 is disposed between the pressure roller 31 and the tension roller 32, and moves along with the pressure roller 31. The middle roller 37 is rotatably supported by a middle roller support 38, and the middle roller support 38 is fixed to the slider 35. The middle roller 37 is in contact with the mold 7 and keeps the length of the curved part 7a constant even when the distance between the pressure roller 31 and the tension roller 32 changes. This configuration makes it possible to stably bring the mold 7 into contact with the molding material layer 6 and stably separate the mold 7 from the patterned indented layer 8. The middle roller 37 is optional and may be omitted.

Next, operations of the pressure roller 31 and other components are described with reference to FIGS. 2A through 3.

First, as illustrated by FIG. 2A, the jig 33 fixes an end of the mold 7 to the stage 20. Next, a driving source such as a rotary motor causes the tension roller 32 to rotate in a direction to wind the mold 7. When tension is applied to the mold 7, the part 7a of the mold 7 wraps around the pressure roller 31 and curves along the circumference of the pressure roller 31. The pressure roller 31 presses the mold 7 against the molding material layer 6.

Next, as illustrated by FIG. 2B, the pressure roller 31 moves rightward in FIG. 2B relative to the thin glass plate 2 supported by the stage 20. The tension roller 32 winds the mold 7 into a roll while applying tension to the mold 7. As a result, the position of the curved part 7a in the mold 7 gradually shifts, the mold 7 is gradually brought into contact with the molding material layer 6, and the contact area increases. This configuration makes it possible to prevent air from entering between the mold 7 and the molding material layer 6, and thereby makes it possible to improve the accuracy of transferring the indented pattern.

During the transfer step, the pressure roller 31 keeps the radius of curvature of the curved part 7a of the mold 7 constant. This configuration stabilizes the load applied to the mold 7 and prevents the mold 7 from being broken. Also, this configuration makes it possible to more reliably prevent air from entering between the mold 7 and the molding material layer 6.

During the transfer step, as illustrated by FIG. 2B, the pressure roller 31 may be configured to move on the mold 7 while rotating around the central axis of the pressure roller 31. This configuration reduces the friction between the mold 7 and the pressure roller 31, and thereby prevents scratches from being formed on the mold 7 and the pressure roller 31.

The moving speed of the pressure roller 31 during the transfer step is preferably constant. This in turn stabilizes the load applied to the mold 7 and prevents the mold 7 from being broken. This also makes it possible to more reliably prevent air from entering between the mold 7 and the molding material layer 6.

In the state illustrated by FIG. 2B, the molding material layer 6 is cured and the patterned indented layer 8 is formed. The pressure roller 31 presses the mold 7 against the patterned indented layer 8.

Next, as illustrated by FIG. 2C, the pressure roller 31 moves leftward in FIG. 2C relative to the thin glass plate 2 supported by the stage 20. The tension roller 32 unwinds the mold 7 while applying tension to the mold 7. As a result, the position of the curved part 7a in the mold 7 gradually shifts, and the mold 7 is gradually separated from the patterned indented layer 8. This configuration makes it possible to reduce a force necessary to separate the mold 7, and thereby makes it possible to prevent the mold 7 and the patterned indented layer 8 from being damaged.

During the separation step, the pressure roller 31 keeps the radius of curvature of the curved part 7a of the mold 7 constant. This in turn stabilizes the load applied to the mold 7 and prevents the mold 7 from being broken.

During the separation step, as illustrated by FIG. 2C, the pressure roller 31 may be configured to move on the mold 7 while rotating around the central axis of the pressure roller 31. This configuration reduces the friction between the mold 7 and the pressure roller 31, and thereby prevents scratches from being formed on the mold 7 and the pressure roller 31.

The moving speed of the pressure roller 31 during the separation step is preferably constant. This in turn stabilizes the load applied to the mold 7 and prevents the mold 7 from being broken. Also, continuously separating the mold 7 from the patterned indented layer 8 makes it possible to prevent a mark from being left on the patterned indented layer 8 by the separation step. When the mold 7 is intermittently separated from the patterned indented layer 8, a linear mark may be formed on the patterned indented layer 8.

In the present embodiment, the pressure roller 31 is used to press the mold 7 against the molding material layer 6 (or the indented patterned layer 8). However, any component having a curved surface (preferably an arc surface) as a part of its outer surface may be used for this purpose. For example, a semi-cylindrical component may be used.

In the present embodiment, the stage 20 is fixed and the pressure roller 31 is moved. However, the stage 20 may be moved and the pressure roller 31 may be fixed, or both of them may be moved.

Figure 4A:
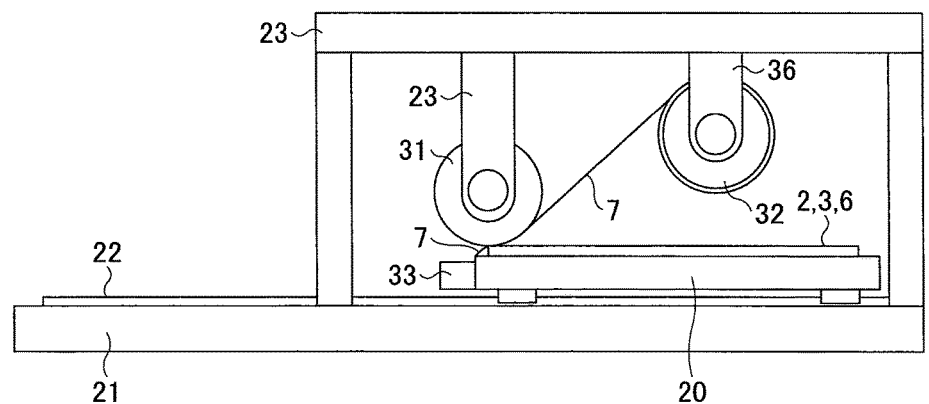
FIGS. 4A through 4C are drawings illustrating variations of a transfer step and a separation step.
Figure 4B:
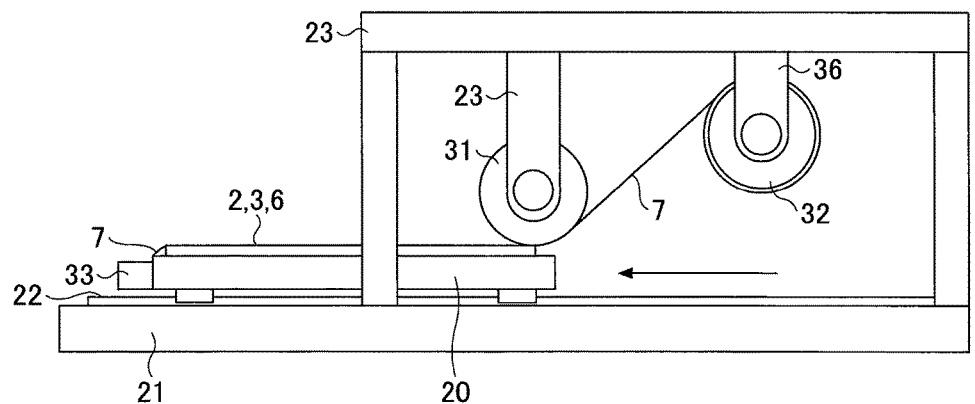
Figure 4C:
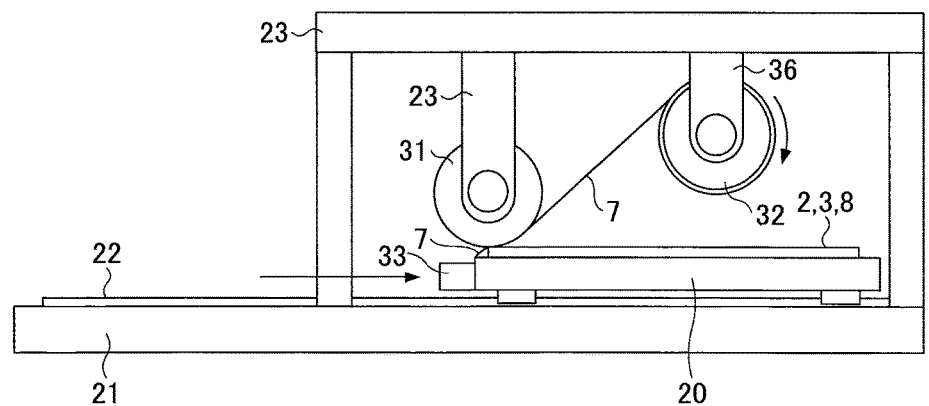

Next, a case where the stage 20 is moved and the pressure roller 31 is fixed is described with reference to FIGS. 4A through 4C. FIGS. 4A through 4C are drawings illustrating variations of the transfer step and the separation step.

The transfer step is performed, for example, using the pressing roller 31 for pressing the mold 7 against the molding material layer 6, the tension roller 32 for applying tension to the mold 7, and the jig 33 for fixing an end of the mold 7. In this variation, the stage 20 is configured to be movable along a guide 22 provided on a support table 21.

The pressure roller 31 is rotatably supported by the pressure roller support 34, and the pressure roller support 34 is fixed to a top plate 23.

The tension roller 32 is rotatably supported by the tension roller support 36, and the tension roller support 36 is fixed to the top plate 23. An end of the mold 7 is fixed to the tension roller 32. When a driving source such as a rotary motor causes the tension roller 32 to rotate in a direction to wind the mold 7, tension is applied to the mold 7, and the part 7a (see FIG. 3) of the mold 7 wraps around the pressure roller 31 and curves along the circumference of the pressure roller 31. The axial direction of the tension roller 32 is parallel to the axial direction of the pressure roller 31. This configuration makes it possible to apply uniform tension to the mold 7.

The jig 33 fixes another end of the mold 7 to the stage 20. Instead of the jig 33, a fixed roller may be used. The fixed roller is rotatably supported by a fixed roller support, and the fixed roller support is fixed to the stage 20. When the tension roller 32 applies tension to the mold 7, rotation of the fixed roller is prevented by, for example, a braking device.

In the variation illustrated by FIGS. 4A through 4C, because the pressure roller 31 does not move relative to the tension roller 32, the middle roller 37 of FIGS. 2A through 2C is not necessary.

Next, referring again to FIGS. 4A through 4C, operations of the pressure roller 31 and other components according to the variation are described.

First, as illustrated by FIG. 4A, the jig 33 fixes an end of the mold 7 to the stage 20. Next, a driving source such as a rotary motor causes the tension roller 32 to rotate in a direction to wind the mold 7. When tension is applied to the mold 7, the part 7a of the mold 7 wraps around the pressure roller 31 and curves along the circumference of the pressure roller 31. The pressure roller 31 presses the mold 7 against the molding material layer 6.

Next, as illustrated by FIG. 2B, the thin glass plate 2 supported by the stage 20 moves leftward in FIG. 2B relative to the pressure roller 31. The tension roller 32 unwinds the mold 7 while applying tension to the mold 7. As a result, the position of the curved part 7a in the mold 7 gradually shifts, the mold 7 is gradually brought into contact with the molding material layer 6, and the contact area increases. Accordingly, this variation also makes it possible to prevent air from entering between the mold 7 and the molding material layer 6, and thereby makes it possible to improve the accuracy of transferring the indented pattern. In the state illustrated by FIG. 4B, the molding material layer 6 is cured and the patterned indented layer 8 is formed. The pressure roller 31 presses the mold 7 against the patterned indented layer 8.

Next, as illustrated by FIG. 4C, the thin glass plate 2 supported by the stage 20 moves rightward in FIG. 4C relative to the pressure roller 31. The tension roller 32 winds the mold 7 into a roll while applying tension to the mold 7. As a result, the position of the curved part 7a in the mold 7 gradually shifts, and the mold 7 is gradually separated from the patterned indented layer 8. Thus, this variation also makes it possible to reduce a force necessary to separate the mold 7, and thereby makes it possible to prevent the mold 7 and the patterned indented layer 8 from being damaged.

In the present embodiment and its variation, the part 7a of the sheet-shaped mold 7 is curved, and the position of the curved part 7a in the mold 7 is shifted so that the mold 7 is gradually brought into contact with the molding material layer 6. However, the mold 7 and the molding material layer 6 may be held in a level position and brought into contact with each other at once. In this case, to prevent air from entering between the mold 7 and the molding material layer 6, the transfer step is preferably performed in a reduced-pressure atmosphere.

<Removal Step>

In the removal step, the reinforcing plate 3 is removed from the thin glass plate 2. For example, in the removal step, a thin blade is inserted into the interface between the thin glass plate 2 and the reinforcing plate 3 to form a removal starting point, and then the reinforcing plate 3 is removed from the thin glass plate 2 while curving (or bending) a part of the reinforcing plate 3

The removal step may be performed at any timing after the transfer step. For example, the removal step may be performed during a process of producing an optical panel. The removal step is preferably performed after the separation step so that the load applied to the thin glass plate 2 during the separation step is received by the reinforcing plate 3.

Thus, the reinforcing plate 3 is removed from the thin glass plate 2 after the patterned indented layer 8 is formed as illustrated by FIG. 1E, and is not used as a part of an optical panel. This makes it possible to reduce the thickness and weight of an optical panel.

<Variations of Steps Performed after Separation Step>

Figure 5A:
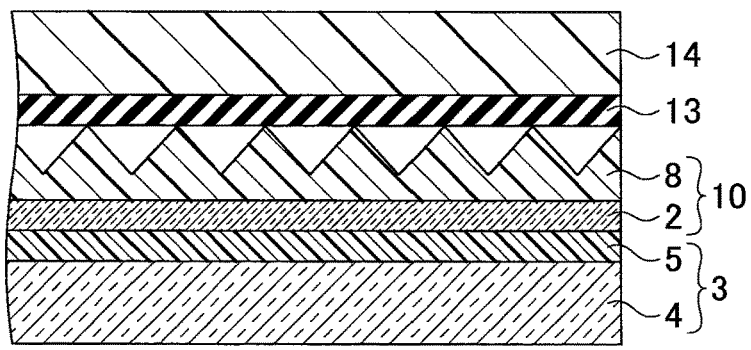
FIGS. 5A through 5C are drawings illustrating variations of steps performed after a separation step of FIG. 1D.
Figure 5B:
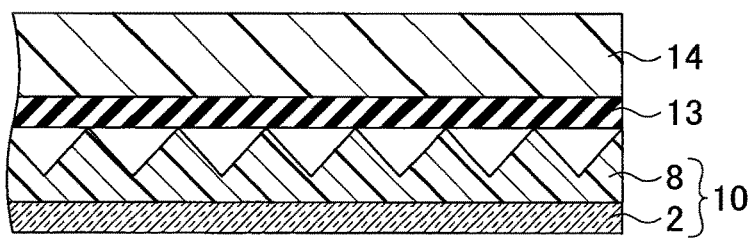
Figure 5C:
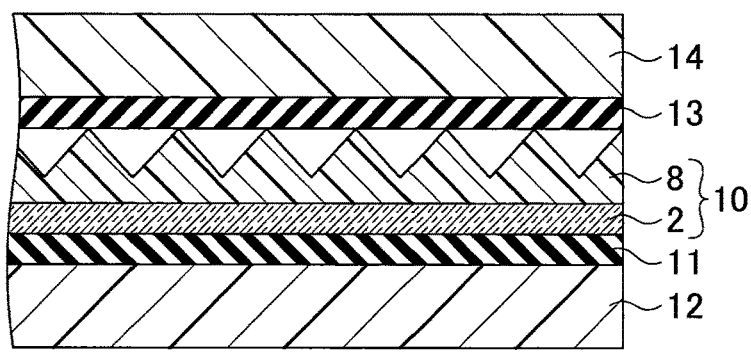

FIGS. 5A through 5C are drawings illustrating variations of steps performed after the separation step of FIG. 1D.

In this variation, after the separation step of FIG. 1D, a step of attaching a protective film 14 via an adhesive layer 13 to the patterned indented layer 8 (FIG. 5A), a removal step of removing the reinforcing plate 3 from the thin glass plate 2 (FIG. 5B), and a step of attaching a protective film 12 via an adhesive layer 11 to the thin glass plate 2 (FIG. 5C) are performed in this order.

The adhesive layers 11 and 13 include, for example, an acrylic resin or an olefin resin. The protective films 12 and 14 include a general thermoplastic resin such as polyethylene terephthalate (PET), polyethylene (PE), or polypropylene (PP).

In this variation, the thin glass plate 2 is reinforced via the adhesive layer 13 by the protective film 14 during the removal step (FIG. 5B) of removing the reinforcing plate 3 from the thin glass plate 2 so that damage to the thin glass plate 2 can be prevented. The protective film 14 and the adhesive layer 13 are removed from the patterned indented layer 8 during a process of producing an optical panel, and are not used as parts of an optical panel. When the protective film 14 has adhesiveness, the adhesive layer 13 is not necessary.

In this variation, the optical component 10 is shipped in the state of FIG. 5C. Alternatively, the optical component 10 may be shipped in the state of FIG. 5A (where the thin glass plate 2 is reinforced by the reinforcing plate 3). In this case, the removal step of removing the reinforcing plate 3 from the thin glass plate 2 is performed during a process of producing an optical panel. Also in this case, the adhesive layer 13 may be omitted, and the protective film 14 may be simply in contact with the patterned indented layer 8 instead of being attached to the patterned indented layer 8.

<Optical Component>

As illustrated by FIGS. 1E and 5C, the optical component 10 includes the thin glass plate 2 and the patterned indented layer 8 formed on the thin glass plate 2. The optical component 10 has translucency.

The thickness of the thin glass plate 2 is preferably less than or equal to 0.3 mm, more preferably less than or equal to 0.2 mm, further preferably less than or equal to 0.1 mm, and particularly preferably less than or equal to 0.05 mm. Also, in terms of formability of the thin glass plate 2, the thickness of the thin glass plate 2 is preferably greater than or equal to 0.0001 mm, more preferably greater than or equal to 0.001 mm, and further preferably greater than or equal to 0.005 mm.

The optical component 10 is, for example, a moth-eye antireflection component. As illustrated by FIG. 1D, the patterned indented layer 8, for example, has a structure where many conical protrusions 8a are arranged on a flat surface. The protrusions 8a are cyclically arranged, for example, in a hexagonal lattice, a quasi-hexagonal lattice, a tetragonal lattice, or a quasi-tetragonal lattice. Adjacent protrusions 8a may be in contact with each other or apart from each other. Also, the bases of adjacent protrusions 8a may overlap each other. A pitch P1 between the protrusions 8a is set at a value that is less than or equal to the wavelength of visible light. This reduces the optical reflectance across a wide wavelength range.

<Method of Producing Optical Panel>

Figure 6A:
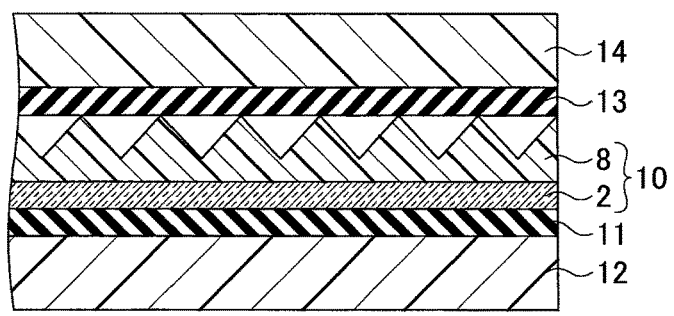
FIGS. 6A through 6C are drawings illustrating a method of producing an optical panel according to the first embodiment.
Figure 6B:
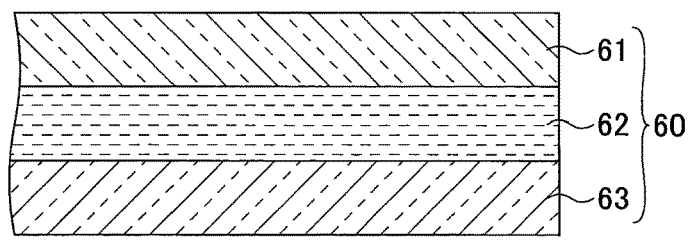
Figure 6C:
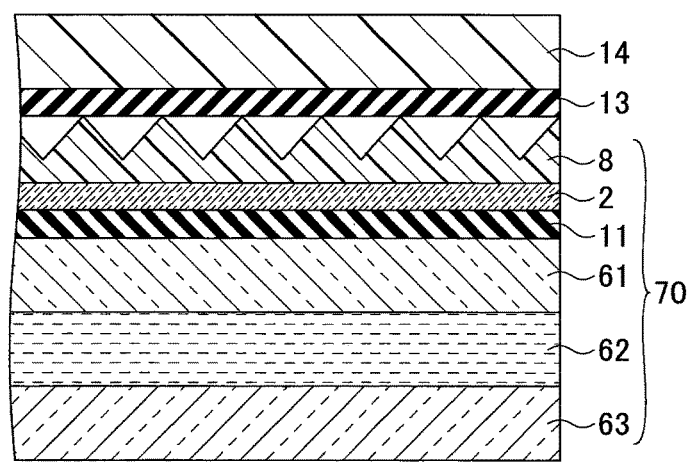

FIGS. 6A through 6C are drawings illustrating a method of producing an optical panel 70 according to the first embodiment. The method of producing the optical panel 70 includes a step of preparing the optical component 10 (FIG. 6A), a step of preparing a laminated panel 60 (FIG. 6B), and a step of bonding the optical component 10 and the laminated panel 60 to each other (FIG. 6C).

In the steps illustrated by FIGS. 5A through 5C, the protective films 12 and 14 are attached via the adhesive layers 11 and 13 to the optical component 10.

As illustrated by FIG. 6B, the laminated panel 60 includes a color filter substrate 61, a liquid crystal layer 62, and an array substrate 63. The color filter substrate 61 includes color filters and transparent electrodes. The array substrate 63 includes active elements such as thin film transistors (TFT) and electrodes used as sub pixels. A polarizing plate or an optical film for view angle correction may be attached to each of a side of the array substrate 63 that is opposite to the liquid crystal layer 62 and a side of the color filter substrate 61 that is opposite to the liquid crystal layer 62.

When bonding the optical component 10 and the laminated panel 60, the protective film 12 protecting the thin glass plate 2 is removed, and the thin glass plate 2 is bonded via the adhesive layer 11 to the laminated panel 60. The thin glass plate 2 is attached to the front side of the laminated panel 60 (i.e., a side opposite to a backlight), for example, to the color filter substrate 61.

Because the thickness and weight of the optical component 10 are reduced, the thickness and weight of the optical panel 70 are also reduced.

<<Second Embodiment>>

FIGS. 7A through 7D are drawings illustrating a method of producing an optical component 110 according to a second embodiment. The optical component 110 of the second embodiment is a wire-grid polarization component used to produce a liquid-crystal panel that is an example of an optical panel. The step of preparing the laminated plate 1 and the step of forming the molding material layer 6 on the thin glass plate 2 of the laminated plate 1 are substantially the same as those illustrated by FIGS. 1A and 1B, and therefore drawings for those steps are omitted.

Figure 7A:
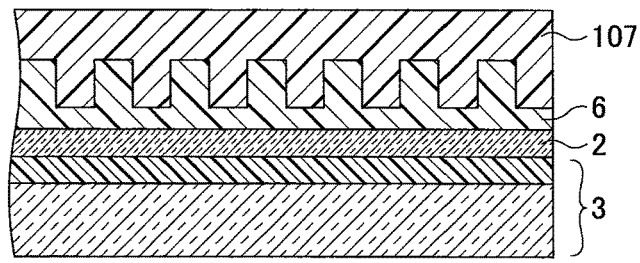
FIGS. 7A through 7D are drawings illustrating a method of producing an optical component according to a second embodiment.
Figure 7B:
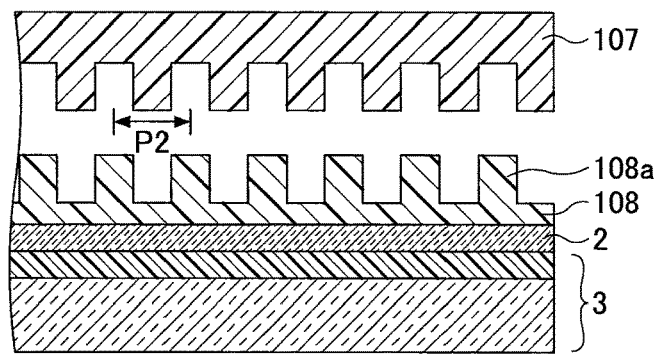

Similarly to the first embodiment, the method of producing the optical component 110 includes a step of preparing the laminated plate 1 (FIG. 1A), a step of forming the molding material layer 6 on the thin glass plate 2 of the laminated plate 1 (FIG. 1B), a transfer step of pressing a mold 107 against a surface of the molding material layer 6 to transfer an indented pattern on the mold 107 to the molding material layer 6 and thereby form a patterned indented layer 108 (FIG. 7A), and a separation step of separating the mold 107 from the patterned indented layer 108 (FIG. 7B). The patterned indented layer 108 has a banded structure where many ridges 108a are arranged at predetermined intervals on a flat surface. A pitch P2 between the ridges 108a is set at a value that is less than or equal to the wavelength of visible light.

In the present embodiment, similarly to the first embodiment, the thin glass plate 2 is removably joined to the reinforcing plate 3 during the transfer step. Reinforcing the thin glass plate 2 with the reinforcing plate 3 makes it possible to prevent the thin glass plate 2 from being broken by a force applied to press the mold 107 against the surface of the molding material layer 6. The reinforcing plate 3 is removed from the thin glass plate 2 after the transfer step, and is not used as a part of an optical panel. This makes it possible to reduce the thickness and weight of an optical panel.

Figure 7C:
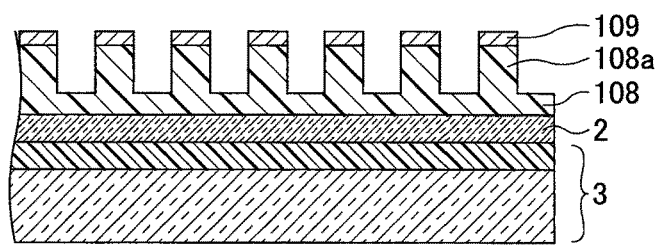

The method of producing the optical component 110 also includes a step of forming a metal wire 109 on the upper end of each of the ridges 108a (FIG. 7C). The metal wires 109 are formed, for example, by depositing a metal material from an obliquely upward position onto the ridges 108a. Examples of metal materials include aluminum, silver, chrome, magnesium, an aluminum alloy, and a silver alloy. Examples of deposition methods include physical vapor deposition methods such as vacuum evaporation, sputtering, and ion plating. The metal wires 109 reflect polarized light that has an electric-field vector oscillating in a direction parallel to the metal wires 109, and transmit polarized light that has an electric-field vector oscillating in a direction orthogonal to the metal wires 109. With this configuration, linearly polarized light is obtained.

Figure 7D:
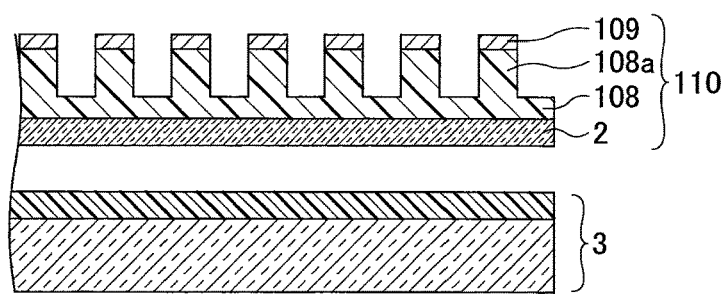

The method of producing the optical component 110 may also include a removal step of removing the reinforcing plate 3 from the thin glass plate 2 (FIG. 7D). The removal step may be performed at any timing after the transfer step. For example, the removal step may be performed during a process of producing an optical panel. The removal step is preferably performed after the separation step so that the load applied to the thin glass plate 2 during the separation step is received by the reinforcing plate 3. More preferably, the removal step is performed after the step of forming the metal wires 109. This makes it possible to keep the thin glass plate 2 in a level position during the formation of the metal wires 109, and thereby makes it possible to accurately form the metal wires 109.

<Optical Component>

As illustrated by FIG. 7D, the optical component 110 includes the thin glass plate 2 and the patterned indented layer 108 formed on the thin glass plate 2. The metal wires 109 are formed on the upper ends of the ridges 108a.

The thickness of the thin glass plate 2 is preferably less than or equal to 0.3 mm, more preferably less than or equal to 0.2 mm, further preferably less than or equal to 0.1 mm, and particularly preferably less than or equal to 0.05 mm. Also, in terms of formability of the thin glass plate 2, the thickness of the thin glass plate 2 is preferably greater than or equal to 0.0001 mm, more preferably greater than or equal to 0.001 mm, and further preferably greater than or equal to 0.005 mm.

The optical component 110 is a wire-grid polarization component. As illustrated by FIG. 7B, the patterned indented layer 108, for example, has a banded structure where the ridges 108a are arranged at predetermined intervals on a flat surface. The pitch P2 between the ridges 108a is set at a value that is less than or equal to the wavelength of visible light.

<Method of Producing Optical Panel>

Figure 8A:
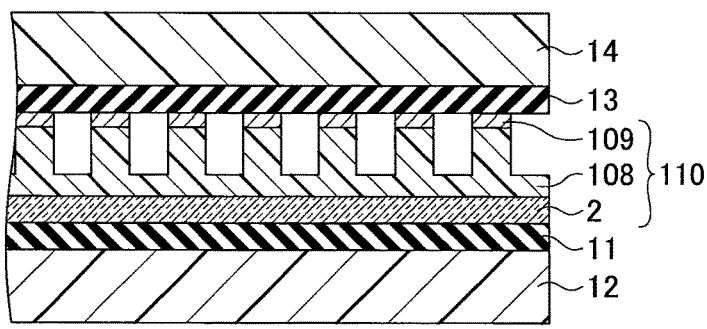
FIGS. 8A through 8C are drawings illustrating a method of producing an optical panel according to the second embodiment.
Figure 8B:
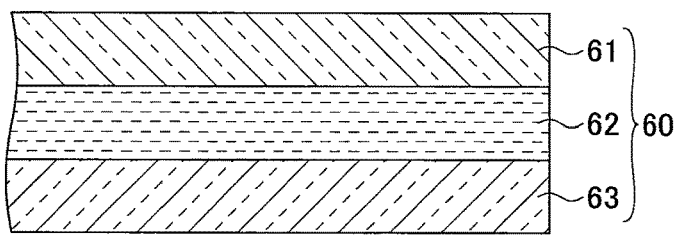
Figure 8C:
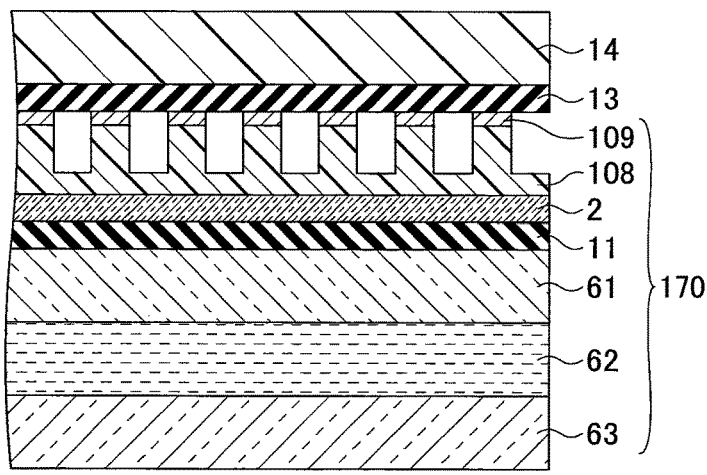

FIGS. 8A through 8C are drawings illustrating a method of producing an optical panel 170 according to the second embodiment. The method of producing the optical panel 170 includes a step of preparing the optical component 110 (FIG. 8A), a step of preparing the laminated panel 60 (FIG. 8B), and a step of bonding the optical component 110 and the laminated panel 60 to each other (FIG. 8C).

The thin glass plate 2 is protected via the adhesive layer 11 by the protective film 12. Similarly, the metal wires 109 are protected via the adhesive layer 13 by the protective film 14. The adhesive layer 13 on the metal wires 109 may be omitted, and the protective film 14 may be simply in contact with the metal wires 109 instead of being attached to the metal wires 109.

When bonding the optical component 110 and the laminated panel 60, the protective film 12 protecting the thin glass plate 2 is removed, and the thin glass plate 2 is bonded via the adhesive layer 11 to the laminated panel 60. The thin glass plate 2 may be attached to either one of the front side and the back side of the laminated panel 60. Also, separate thin glass plates 2 may be attached, respectively, to the front side and the back side of the laminated panel 60.

Because the thickness and weight of the optical component 110 are reduced, the thickness and weight of the optical panel 170 are also reduced.

<<Third Embodiment>>

Figure 9A:
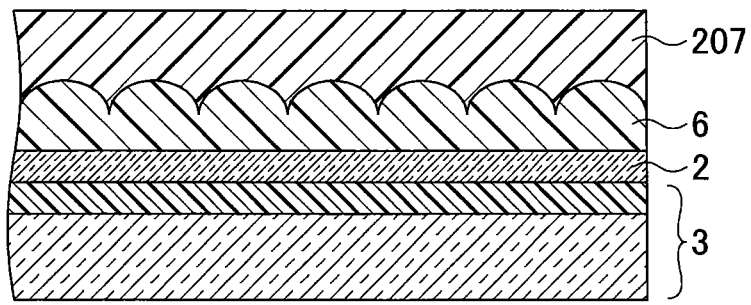
FIGS. 9A through 9C are drawings illustrating a method of producing an optical component according to a third embodiment.
Figure 9B:
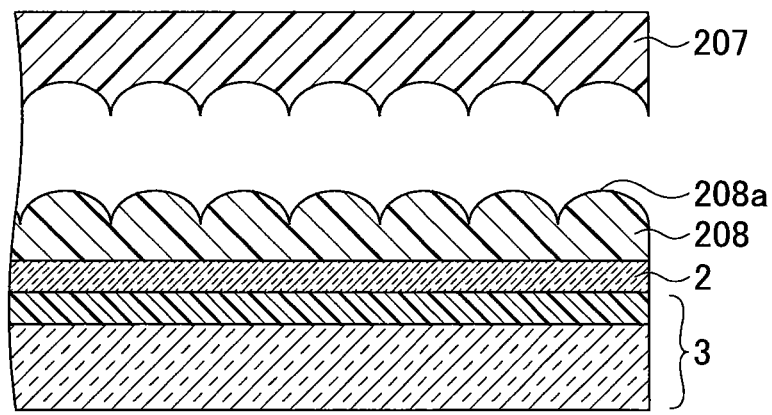
Figure 9C:
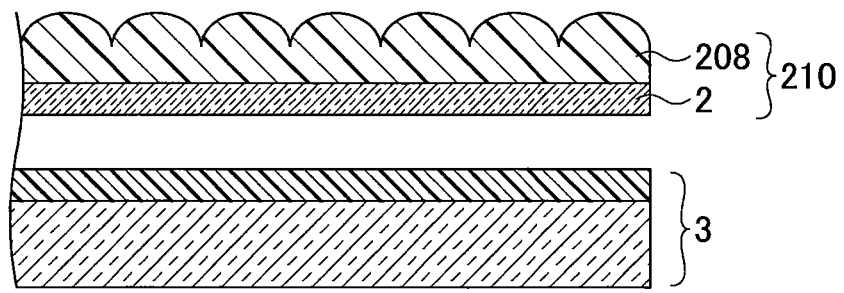

FIGS. 9A through 9C are drawings illustrating a method of producing an optical component 210 according to a third embodiment. The optical component 210 of the third embodiment is a lenticular lens used to produce a liquid-crystal panel that is an example of an optical panel. The step of preparing the laminated plate 1 and the step of forming the molding material layer 6 on the thin glass plate 2 of the laminated plate 1 are substantially the same as those illustrated by FIGS. 1A and 1B, and therefore drawings for those steps are omitted.

Similarly to the first embodiment, the method of producing the optical component 210 includes a step of preparing the laminated plate 1 (FIG. 1A), a step of forming the molding material layer 6 on the thin glass plate 2 of the laminated plate 1 (FIG. 1B), a transfer step of pressing a mold 207 against a surface of the molding material layer 6 to form a patterned indented layer 208 (FIG. 9A), and a separation step of separating the mold 207 from the patterned indented layer 208 (FIG. 9B). The patterned indented layer 208 has a structure where many convex cylindrical lenses 208a are arranged on a flat surface without leaving spaces between them.

In the present embodiment, similarly to the first embodiment, the thin glass plate 2 is removably joined to the reinforcing plate 3 during the transfer step. Reinforcing the thin glass plate 2 with the reinforcing plate 3 makes it possible to prevent the thin glass plate 2 from being broken by a force applied to press the mold 207 against the surface of the molding material layer 6. The reinforcing plate 3 is removed from the thin glass plate 2 after the transfer step, and is not used as a part of an optical panel. This makes it possible to reduce the thickness and weight of an optical panel.

The method of producing the optical component 210 may also include a removal step of removing the reinforcing plate 3 from the thin glass plate 2 (FIG. 9C). The removal step may be performed at any timing after the transfer step. For example, the removal step may be performed during a process of producing an optical panel. The removal step is preferably performed after the separation step so that the load applied to the thin glass plate 2 during the separation step is received by the reinforcing plate 3.

<Optical Component>

As illustrated by FIG. 9C, the optical component 210 includes the thin glass plate 2 and the patterned indented layer 208 formed on the thin glass plate 2. The optical component 210 has translucency.

The thickness of the thin glass plate 2 is preferably less than or equal to 0.3 mm, more preferably less than or equal to 0.2 mm, further preferably less than or equal to 0.1 mm, and particularly preferably less than or equal to 0.05 mm. Also, in terms of formability of the thin glass plate 2, the thickness of the thin glass plate 2 is preferably greater than or equal to 0.0001 mm, more preferably greater than or equal to 0.001 mm, and further preferably greater than or equal to 0.005 mm.

The optical component 210 is, for example, a lenticular lens. The patterned indented layer 208 has a structure as illustrated by FIG. 9B where many convex cylindrical lenses 208a are arranged on a flat surface without leaving spaces between them. Each of the convex cylindrical lenses 208a focuses light of an image for the left eye on the left eye of a user and focuses light of an image for the right eye on the right eye of the user.

The pitch between the convex cylindrical lenses 208a is preferably between several tens μm and several hundred μm, and more preferably between several tens nm and several hundred nm.

<Method of Producing Optical Panel>

Figure 10A:
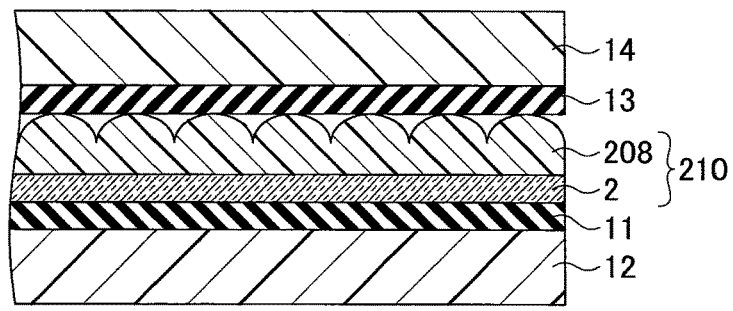
FIGS. 10A through 10C are drawings illustrating a method of producing an optical panel according to the third embodiment.
Figure 10B:
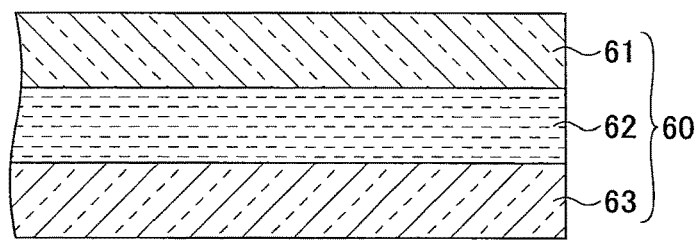
Figure 10C:
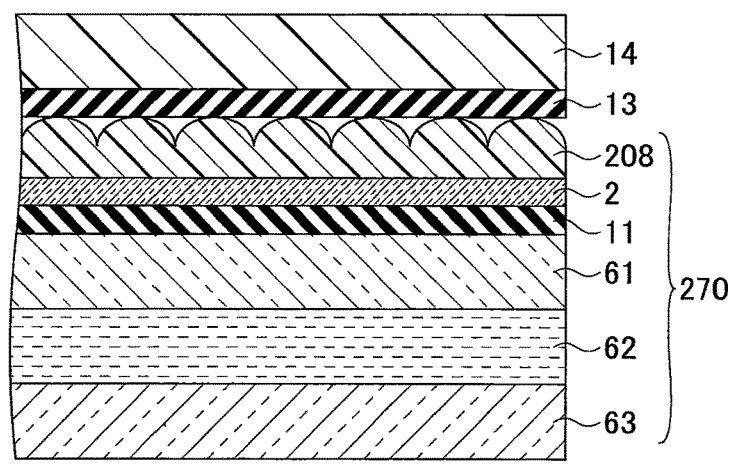

FIGS. 10A through 10C are drawings illustrating a method of producing an optical panel 270 according to the third embodiment. The method of producing the optical panel 270 includes a step of preparing the optical component 210 (FIG. 10A), a step of preparing the laminated panel 60 (FIG. 10B), and a step of bonding the optical component 210 and the laminated panel 60 to each other (FIG. 10C).

The thin glass plate 2 is protected via the adhesive layer 11 by the protective film 12. Similarly, the patterned indented layer 208 is protected via the adhesive layer 13 by the protective film 14. The adhesive layer 13 on the patterned indented layer 208 may be omitted, and the protective film 14 may be simply in contact with the patterned indented layer 208 instead of being attached to the patterned indented layer 208.

When bonding the optical component 210 and the laminated panel 60, the protective film 12 protecting the thin glass plate 2 is removed, and the thin glass plate 2 is bonded via the adhesive layer 11 to the laminated panel 60. The thin glass plate 2 is attached to the front side of the laminated panel 60.

Because the thickness and weight of the optical component 210 are reduced, the thickness and weight of the optical panel 270 are also reduced. Also, because the substrate of the optical component 210 is made of glass, the change in the pitch between lenses caused by heat generated by the operation of an optical panel is smaller than in a case where the substrate is made of a resin having a linear expansion coefficient greater than that of glass. This in turn improves image quality.

Alternatively, the thin glass plate 2 may be attached to the back side of the laminated panel 60, and the convex cylindrical lenses 208a may be used to collimate light from a light source. In this case, instead of the convex cylindrical lenses 208a arranged one-dimensionally, micro lenses arranged two-dimensionally may be formed.

<<Fourth Embodiment>>

Figure 11A:
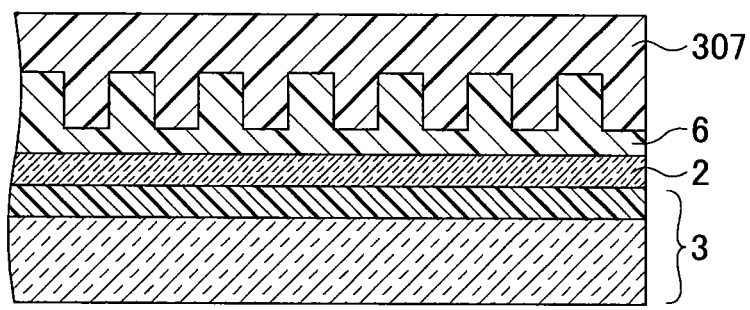
FIGS. 11A through 11C are drawings illustrating a method of producing an optical component according to a fourth embodiment.
Figure 11B:
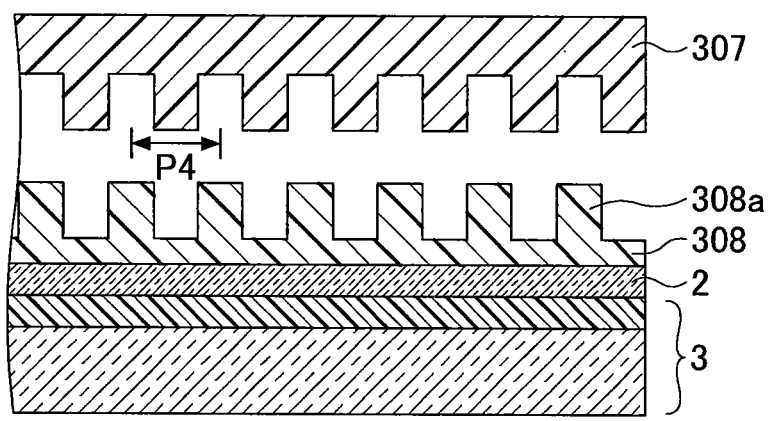
Figure 11C:
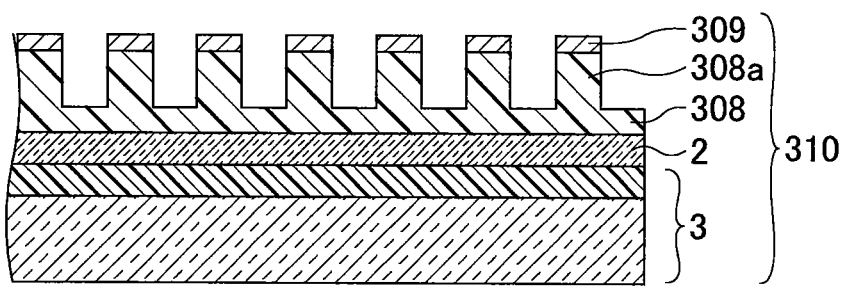

FIGS. 11A through 11C are drawings illustrating a method of producing an optical component 310 according to a fourth embodiment. The optical component 310 of the fourth embodiment is a wire-grid polarization component used to produce a liquid-crystal panel that is an example of an optical panel. Different from the liquid crystal panel of the second embodiment, the liquid crystal panel of the fourth embodiment is an in-cell liquid crystal panel whose color filter substrate or an array substrate includes metal wires.

Similarly to the second embodiment, the method of producing the optical component 310 includes a step of preparing the laminated plate 1 (FIG. 1A), a step of forming the molding material layer 6 on the thin glass plate 2 of the laminated plate 1 (FIG. 1B), a transfer step of pressing a mold 307 against a surface of the molding material layer 6 to form a patterned indented layer 308 (FIG. 11A), and a separation step of separating the mold 307 from the patterned indented layer 308 (FIG. 11B). The patterned indented layer 308 has a banded structure where many ridges 308a are arranged at predetermined intervals on a flat surface. A pitch P4 between the ridges 308a is set at a value that is less than or equal to the wavelength of visible light.

In the present embodiment, similarly to the second embodiment, the thin glass plate 2 is removably joined to the reinforcing plate 3 during the transfer step. Reinforcing the thin glass plate 2 with the reinforcing plate 3 makes it possible to prevent the thin glass plate 2 from being broken by a force applied to press the mold 307 against the surface of the molding material layer 6. The reinforcing plate 3 is removed from the thin glass plate 2 after the transfer step, and is not used as a part of an optical panel. This makes it possible to reduce the thickness and weight of an optical panel.

The method of producing the optical component 310 also includes a step of forming a metal wire 309 on the upper end of each of the ridges 308a (FIG. 11C). The metal wires 309 are formed, for example, by depositing a metal material from an obliquely upward position onto the ridges 308a. The metal wires 309 reflect polarized light that has an electric-field vector oscillating in a direction parallel to the metal wires 309, and transmit polarized light that has an electric-field vector oscillating in a direction orthogonal to the metal wires 309. With this configuration, linearly polarized light is obtained.

The method of producing the optical component 310 may not include the removal step of removing the reinforcing plate 3 from the thin glass plate 2 (FIG. 7D). The removal step may be performed during a process of producing an optical panel.

<Optical Component>

As illustrated by FIG. 11C, the optical component 310 includes the thin glass plate 2 and the patterned indented layer 308 formed on the thin glass plate 2. The metal wires 309 are formed on the upper ends of the ridges 308a. The optical component 310 also includes the reinforcing plate 3.

The thickness of the thin glass plate 2 is preferably less than or equal to 0.3 mm, more preferably less than or equal to 0.2 mm, further preferably less than or equal to 0.1 mm, and particularly preferably less than or equal to 0.05 mm. Also, in terms of formability of the thin glass plate 2, the thickness of the thin glass plate 2 is preferably greater than or equal to 0.0001 mm, more preferably greater than or equal to 0.001 mm, and further preferably greater than or equal to 0.005 mm.

The optical component 310 is a wire-grid polarization component. As illustrated by FIG. 11B, the patterned indented layer 308, for example, has a banded structure where the ridges 308a are arranged at predetermined intervals on a flat surface. The pitch P4 between the ridges 308a is set at a value that is less than or equal to the wavelength of visible light.

<Method of Producing Optical Panel>

Figure 12A:
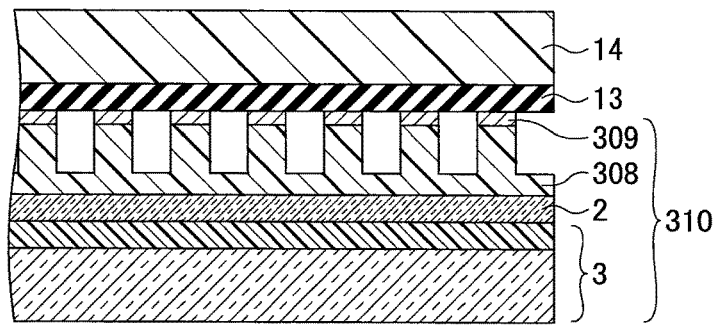
FIGS. 12A through 12C are drawings illustrating a method of producing an optical panel according to the fourth embodiment.
Figure 12B:
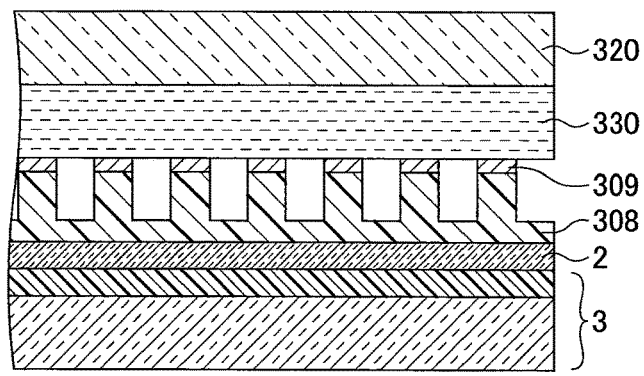
Figure 12C:
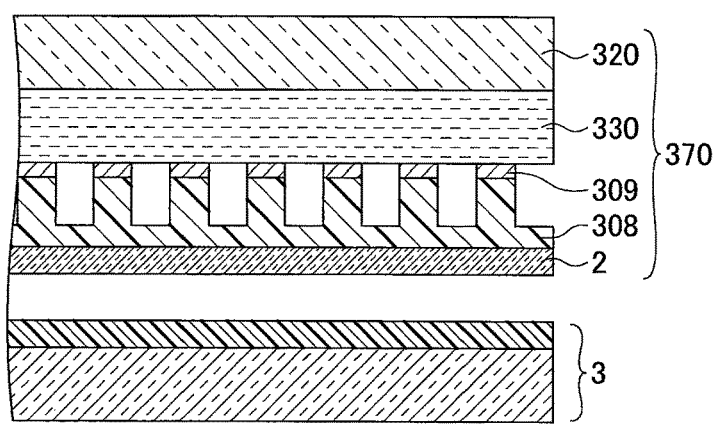

FIGS. 12A through 12C are drawings illustrating a method of producing an optical panel 370 according to the fourth embodiment. The method of producing the optical panel 370 includes a step of preparing the optical component 310 (FIG. 12A), a step of enclosing a liquid crystal layer 330 between the thin glass plate 2 and a facing substrate 320 (FIG. 12B), and a step of removing the reinforcing plate 3 from the optical component 2 (FIG. 12C).

The thin glass plate 2 of the optical component 310 is supported by the reinforcing plate 3, and the optical component 310 includes the reinforcing plate 3. The metal wires 309 are protected via the adhesive layer 13 by the protective film 14. The adhesive layer 13 may be omitted, and the protective film 14 may be simply in contact with the metal wires 309 instead of being attached to the metal wires 309.

After the protective film 14 (and the adhesive layer 13) is removed, for example, color filters and transparent electrodes are formed on the thin glass plate 2 of the optical component 310. Because the thin glass plate 2 is kept in a level position by the reinforcing plate 3 during this step, it is possible to accurately form color filters and transparent electrodes. The thin glass plate 2 and the color filters constitute a color filter substrate. In this case, the facing substrate 320 functions as an array substrate and includes active elements (e.g., TFT) and electrodes.

Alternatively, after the protective film 14 (and the adhesive layer 13) is removed, optical panel components such as active elements (e.g., TFT) and electrodes may be formed on the thin glass plate 2. Because the thin glass plate 2 is kept in a level position by the reinforcing plate 3 during this step, it is possible to accurately form the active elements. The thin glass plate 2 and the active elements constitute an array substrate. In this case, the facing substrate 320 includes color filters and transparent electrodes.

Then, as illustrated by FIG. 12B, the liquid crystal layer 330 is enclosed between the facing substrate 320 and the color filter substrate (or the array substrate) including the thin glass plate 2. Thereafter, the reinforcing plate 3 is removed from the thin glass plate 2, and is not used as a part of the optical panel 370.

The above method makes it possible to reduce the thickness and weight of the thin glass plate 2 used as the substrate of the optical component 310, and thereby makes it possible to reduce the thickness and weight of the optical panel 370.

Optical component production methods, optical components, and optical panel production methods according to the first through fourth embodiments and their variations are described above. However, the present invention is not limited to the specifically disclosed embodiments, and variations and modifications may be made without departing from the scope of the present invention.

For example, although a liquid crystal panel is used as an example of an optical panel in the above embodiments, an optical panel may be an organic electroluminescence (EL) panel. Also, although an optical panel in the above embodiments is assumed to be an image display panel for displaying an image, an optical panel may be an illumination panel that does not display an image.

Further, although the separation step is performed after a molding material is cured in the transfer step in the above embodiments, the molding material may be cured after the separation step.

An aspect of this disclosure provides an optical component production method, an optical component, and an optical panel production method that make it possible to reduce the thickness of a glass plate used as a substrate.

What is claimed is:

1. A method of producing an optical component, the method comprising:
    sandwiching a molding material layer of a molding material between a thin glass plate and a flexible mold and transferring an indented pattern on the flexible mold to the molding material layer to form a patterned indented layer on the thin glass plate; and
    separating the flexible mold from the patterned indented layer,
    wherein during the transferring, a reinforcing plate is removably attached to the thin glass plate; and
    wherein the transferring comprises
    supporting the thin glass plate in a level position,
    applying tension to the flexible mold by rotating a tension roller to which one end of the flexible mold is fixed so that a part of the flexible mold wraps around a pressing part that presses the flexible mold against the molding material layer and is curved along the pressing part, and
    gradually pressing the flexible mold against the molding material layer by moving at least one of the pressing part and the thin glass plate relative to the other.

2. The method as claimed in claim 1, wherein the separating comprises
    supporting the thin glass plate in a level position,
    applying tension to the flexible mold by rotating the tension roller so that a part of the flexible mold wraps around the pressing part and is curved along the pressing part, and
    gradually separating the flexible mold from the patterned indented layer by moving at least one of the pressing part and the thin glass plate relative to the other.

3. The method as claimed in claim 2, further comprising removing the reinforcing plate from the thin glass plate.

4. The method as claimed in claim 2, wherein the reinforcing plate comprises a support plate and a removable layer formed on the support plate; and the removable layer is removably joined to the thin glass plate.

5. The method as claimed in claim 2, wherein a thickness of the thin glass plate is less than or equal to 0.3 mm.

6. A method of producing an optical panel, the method comprising:
    producing an optical component by the method of claim 2; and
    producing the optical panel using the optical component.

7. The method as claimed in claim 6, wherein the optical panel is one of a liquid crystal panel and an organic electroluminescence panel.

8. The method as claimed in claim 1, further comprising removing the reinforcing plate from the thin glass plate.

9. The method as claimed in claim 1, wherein the reinforcing plate comprises a support plate and a removable layer formed on the support plate; and the removable layer is removably joined to the thin glass plate.

10. The method as claimed in claim 1, wherein a thickness of the thin glass plate is less than or equal to 0.3 mm.

11. A method of producing an optical panel, the method comprising: producing an optical component by the method of claim 1; and producing the optical panel using the optical component.

12. The method as claimed in claim 11, wherein the optical panel is one of a liquid crystal panel and an organic electroluminescence panel.

13. A method of producing an optical component, the method comprising:
    sandwiching a molding material layer of a molding material between a thin glass plate and a flexible mold and transferring an indented pattern on the flexible mold to the molding material layer to form a patterned indented layer on the thin glass plate; and
    separating the flexible mold from the patterned indented layer,
    wherein during the transferring a reinforcing plate is removably attached to the thin glass plate; and
    the separating comprises
    supporting the thin glass plate in a level position,
    applying tension to the flexible mold by rotating a tension roller to which one end of the flexible mold is fixed so that a part of the flexible mold wraps around a pressing part that presses the flexible mold against the patterned indented layer and is curved along the pressing part, and
    gradually separating the flexible mold from the patterned indented layer by moving at least one of the pressing part and the thin glass plate relative to the other.

14. The method as claimed in claim 13, further comprising removing the reinforcing plate from the thin glass plate.

15. The method as claimed in claim 13, wherein the reinforcing plate comprises a support plate and a removable layer formed on the support plate; and the removable layer is removably joined to the thin glass plate.

16. The method as claimed in claim 13, wherein a thickness of the thin glass plate is less than or equal to 0.3 mm.

17. A method of producing an optical panel, the method comprising:
    producing an optical component by the method of claim 13; and
    producing the optical panel using the optical component.

18. The method as claimed in claim 17, wherein the optical panel is one of a liquid crystal panel and an organic electroluminescence panel.

* * * * *